3,454,505
POLYURETHANES FROM HEXAHYDROTOLUENE DIISOCYANATES

James Martin Cross and Sidney H. Metzger, Jr., New Martinsville, and Clyde D. Campbell, Wheeling, W. Va., assignors to Mobay Chemical Company, Pittsburgh, Pa., a corporation of Delaware
No Drawing. Original application June 1, 1964, Ser. No. 371,842, now Patent No. 3,351,650, dated Nov. 7, 1967. Divided and this application June 27, 1966, Ser. No. 571,669
Int. Cl. C08g 22/04, 22/18, 41/02
U.S. Cl. 260—2.5                        4 Claims

ABSTRACT OF THE DISCLOSURE

Polyurethane plastics are prepared by reacting a mixture of at least 50% 2,4- and at least 5% 2,6-hexahydrotoluene diisocyanate with an organic compound containing at least 2 active hydrogen containing groups as determined by the Zerewitinoff method.

---

This application is a division of parent application, Ser. No. 371,842, filed June 1, 1964, now U.S. Patent No. 3,351,650, granted Nov. 7, 1967, which in turn was a continuation-in-part of Ser. No. 326,243, filed Nov. 26, 1963, now abandoned.

This invention relates to organic polyamines, organic polyisocyanates and polyurethane plastics prepared therefrom. More particularly, this invention relates to substituted cyclohexylene polyamines, polyisocyanates and improved light-stable polyurethanes based on substituted cyclohexylene polyisocyanates. This application is a continuation-in-part of our copending application Ser. No. 326,243.

The compound 2,4-hexahydrotoluene diisocyanate is disclosed in Annalen der Chemie, 532, 125 (1948). This compound in pure form has not become commercially important in spite of many apparent advantages for using it in the prepaartion of light-stable polyurethane plastics.

It is therefore an object of this invention to provide desirable substituted cyclohexylene polyamines, substituted cyclohexylene polyisocyanates and light-stable polyurethane plastics prepared therefrom. Still another object of this invention is to provide cyclohexylene based diamines and diisocyanates which will react smoothly and evenly with active hydrogen containing compounds to produce improved polyurethane plastics. Still a further object of this invention is to provide cyclohexylene based diisocyanates which exhibit improved properties and are easier to prepare than heretofore known cyclohexylene polyisocyanates. Still another object of this invention is to provide a method of preparing substituted cyclohexylene diisocyanates. Still another object of this invention is to provide casting compositions, elastomers and cellular polyurethane plastics based on these mixed isomers of cyclohexylene based polyisocyanates.

The foregoing objects and others which will become apparent from the following description are accomplished in accordance with the invention, generally speaking, by providing lower alkyl cyclohexylene polyamines and polyisocyanates and polyurethanes prepared therefrom.

Thus, this invention contemplates mixed isomers of lower alkyl cyclohexylene, the lower alkyl cyclohexylene polyisocyanates prepared therefrom and in turn polyurethanes prepared from these polyisocyanates. The diamines of the invention are mixtures which may be phosgenated to prepare mixtures of isocyanates which have little tendency to settle out of solution and thus are more compatible with organic compounds. This property makes the mixture of the isocyanates particularly useful for the preparation of polyurethane plastics particularly coatings, foams and elastomers. The mixtures of isocyanates of this invention have less tendency to dimerize than the heretofore known pure compound, 2,4-hexahydrotoluene diisocyanate. The storage stability of the mixtures of isocyanates of this invention is better than the storage stability of the pure compound with less tendency toward sediment and solids which are troublesome in polyurethane plastic preparation. Consequently these new isocyanates offer the advantage of simultaneous improved chemical compatibility with the other components in a polyurethane plastic formulation and improved physical compatibility because of less solids which tend to plug feed lines and small orifices in machine mixing equipment.

No attempt is made herein to explain the improved compatibility of the mixed isomers with organic components of polyurethane coatings or foams. It is pointed out, for example, that a mixture of 2,4- and 2,6- hexahydrotoluene diisocyanate has a lower melting point than the pure 2,4-isomer and that it is believed that the 4 position reacts more rapidly than the others with active hydrogen compounds.

The mixture of isomers is preferably such that there is at least 50 percent of the 2,4-isomer present and at least 5 percent of the 2,6-isomer present. Particularly preferred compounds are mixtures of 65 percent 2,4- and 35 percent 2,6-hexahydrotoluene diamine or diisocyanate as the case may be and 80 percent 2,4- and 20 percent 2,6-hexahydrotoluene diamine or diisocyanate.

The isocyanates of the present invention are preferably prepared in a two-step process. In the first stage, the corresponding aromatic amines, for example, 2,4- and 2,6-toluylene diamine, are hydrogenated to prepare the amines of the invention such as hexahydrotoluene 2,4-diamine and 2,6-diamine. In the second stage, the amine is converted to the isocyanate, preferably by reaction with phosgene. In the hydrogenation stage, any suitable hydrogenation catalyst is used preferably together with a solvent and the reaction is preferably carried out under pressure and by any suitable hydrogenation reaction including those disclosed in U.S. Patent 2,817,444. Any suitable hydrogenation catalyst may be used including, for example, platinum, ruthenium, rhodium, nickel, copper, chromium alloys, base promoted cobalt catalysts such as disclosed in OPB Report PB-742 (1941), and the like. Depending on the selection of the hydrogenation catalysts, the temperature of hydrogenation may vary over a wide range, preferably between about 25 and about 300° C. and most preferably in the range of about 50 to 250° C. The hydrogenation can be carried out in the presence of ammonia to reduce side reactions. Moreover, the hydrogenation reaction may be carried out at atmospheric pressure or even at elevated pressures of up to about 5,000 p.s.i.g. The most preferred hydrogenation pressure is from about 50 p.s.i.g. up to about 1500 p.s.i.g.

In the event 100 percent conversion of the aromatic amine to the cyloaliphatic compound is not obtained, then it is possible to separate the saturated ring amines from the aromatic amines by distillation since the toluylene diamine boils at about 280 to 284° C. and the hexahydrotoluene diamine boils at about 207° C.

The resulting amines could be represented by the formula:

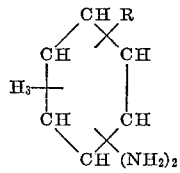

wherein R is lower alkyl such as methyl, ethyl propyl, butyl and the like with the proviso that there areat least two separate isomers present in the product. Preferred examples are mixtures of 2,4- and 2,6-lower alkyl cyclohexylene diamine. The mixed isomers of amines give improved solubility in solvents, thus facilitating conversion to the corresponding isocyanate. Illustrative specific examples of amines contemplated are mixtures of 2,4-hexahydrotoluene diamine with 2,6-hexahydrotoluene diamine, mixtures of ethyl cyclohexylene-2,4-diamine with ethyl cyclohexylene-2,6-diamine, and corresponding propyl and butyl derivatives, and the like, including mixtures of ethyl cyclohexylene-2,4-diamine with 2,6-hexahydrotoluene diamine and the like. It is preferred to have at least 50 percent of the mixed isomers present as the 2,4-isomer and at least 5 percent as the 2,6-isomer because these offer improved compatibility with solvents thus facilitating conversion of the amine to the isocyanate.

In the conversion of the cycloaliphatic amine to an isocyanate, any suitable known process may be used including, for example, phosgenation of the amine or an amine salt as, for example, disclosed at page 108 of the Annalen der Chemie article supra. It is preferred to use the so-called cold phase-hot phase phosgenation process wherein the amine is mixed with an inert organic solvent such as, for example, monochlorobenzene, dichlorobenzene, toluene and diethyl ether of diethylene glycol or the like and then combined with $CO_2$ to form a salt and the salt is mixed with phosgene at a temperature preferably between about $-10°$ C. and about $80°$ C. in a first step to produce a mixture of carbamyl chloride and amine hydrochloride which forms a slurry. The slurry is then further phosgenated at a temperature of from about $50°$ C. to about $200°$ C. to prepare the isocyanate.

Preferred isocyanates of the invention may be represented by the formula:

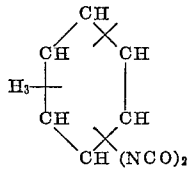

wherein R is a lower alkyl radical such as methyl, ethyl, propyl, butyl and the like with the proviso that there are at least two isomers present in the product of which preferably at least 50 percent are 2,4-isocyanato isomers and at least 5 percent are 2,6-isocyanato isomers.

Illustartive mixtures of isocyanates contemplated by the present invention include mixtures of lower alkyl cyclohexylene diisocyanates which have improved compatibility with polyurethane components such as mixtures of 50 percent 2,4-lower alkyl cyclohexylene diisocyanate with from 5 to 50 percent 2,6-lower alkyl cyclohexylene diisocyanate. A preferred composition of the invention is a mixture of from about 65 to about 80 percent 2,4-hexahydrotoluene diisocyanate with a corresponding amount to yield a total of about 100 percent within the range of from about 20 to about 25 percent of 2,6-hexahydrotoluene diisocyanate. The ethyl derivatives may also be used such as, for example, 80 percent ethyl cyclohexylene-2,4-diisocyanate and 20 percent ethyl cyclohexylene-2,6-diisocyanate: or the propyl derivatives may may be used such as, for example, 80 percent propyl cyclohexylene-2,4-diisocyanate, and 20 percent propyl cyclohexylene-2,6-diisocyanate. Moreover, it is possible to mix the lower alkyl radicals. Thus, one may mix, for example, 75 percent 2,4-hexahydrotoluene diisocyanate with 25 percent ethyl cyclohexylene-2,6-diisocyanate. All of the mixtures of isocyanates are contemplated by the invention but it is preferred that there are at least two isomers or two isomer homologues in the reaction mixture having —NCO groups attached to different ring carbon atoms.

A particularly preferred form of the invention is the use of these mixtures of lower alkyl cyclohexylene diisocyanate isomers to prepare light-stable polyurethane plastic in a smooth and uncomplicated fashion. One may prepare coatings, cellular polyurethane plastics or non-porous solid elastomeric polyurethane plastics in accordance with the process of the present invention. Moreover, it is not necessary to use refined products but they may be used in their unrefined state together with the by-products of either the phosgenation reaction or the hydrogenation reaction. Moreover, it is possible to use them in admixture with the conventional heretofore known isocyanates since once the rate of reactivity is somewhat adjusted with these compositions, it is possible to produce light-stability and a smooth reaction without totally replacing the heretofore known aromatic polyisocyanates. It is preferred that at least 50 percent by weight of the polyisocyanates used be the mixed isomers of this invention.

The polyurethane plastics of the invention are prepared by reacting the cyclohexylene diisocyanates with an organic compound containing active hydrogen containing groups as determined by the Zerewitinoff method. Generally speaking, any compound having an active hydrogen atom as defined above which will react with an —NCO group to yield urethane groups whereas carboxylic acids yield amide groups and amines yield ureas. The alcoholic group is strongly preferred because it is readily available and yields a stronger urethane linkage than a phenolic type hydroxyl group. Moreover, to prepare polyurethane plastics, it is preferred to have an organic compound of the type specified above which contains a plurality of active hydrogen containing groups and preferably at least some alcoholic hydroxyl groups. It is to be understood that when the above terminology is used, active hydrogen containing compounds are contemplated which may contain any of the following types of active hydrogen containing groups, among others, —OH, —$NH_2$ —NH—, —COOH, —SH and the like. Examples of suitable types of organic compound containing at least two active hydrogen containing groups which are reactive with an isocyanate group are hydroxyl polyesters, polyhydric polyalkylene ethers, polyhydric polythioethers, polyacetals, aliphatic polyols, including alkane, alkene and alkyne diols, triols, tetrols and the like, aliphatic thiols including alkane, alkene and alkyne thiols having two or more —SH groups; polyamines including both aromatic, aliphatic and heterocyclic diamines, triamines, tetramines and the like; as well as mixtures thereof. Of course, compounds which contain two or more different groups within the above-defined classes may also be used in accordance with the process of the present invention such as, for example, amino alcohols which contain an amino group and an hydroxyl group, amino alcohols which contain two amino groups and one hydroxyl group and the like. Also, compounds may be used which contain one —SH group and one —OH group or two —OH groups and one —SH group as well as those which contain an amino group and an —SH group and the like.

The molecular weight of the organic compound containing at least two active hydrogen containing groups may vary over a wide range. Preferably, however, at least one of the organic compounds containing at least two active hydrogen containing groups which is used in the production of the polyurethane plastic has a molecular weight of at least about 200 and preferably between about 500 and about 5000 with an hydroxyl number within the range of from about 25 to about 800 and acid numbers, where applicable, below about 5. A satisfactory upper limit for the molecular weight of the organic compound containing at least two active hydrogen containing groups is about 10,000 but this limitation may vary so long as satisfactory mixing of the organic compound containing at least two active hydrogen containing groups with the organic polyisocyanate can be obtained. In addition to the high molecular weight organic compound containing at least two active hydrogen containing groups, it is desirable to use an organic compound of this type having a molecular weight below about 750 and preferably below about 500. Aliphatic diols and triols are most preferred for this purpose.

Any suitable hydroxyl polyester may be used such as are obtained, for example, from polycarboxylic acids and polyhydric alcohols. Any suitable polycarboxylic acid may be used such as, for example, oxalic acid, malonic acid, succinic acid, glutaric acid, adipic acid, pimelic acid, suberic acid, azelaic acid, sebacic acid, brassylic acid, thapsic acid, maleic acid, fumaric acid, glutaconic acid, alpha-hydromuconic acid, beta-hydromuconic acid, alpha-butyl-alpha-ethyl-glutaric acid, alpha-beta-diethylsuccinic acid, isophthalic terephthalic acid, hemimellitic acid, trimellitic acid, trimesic acid, mellophanic acid, prehnitic acid, pyromellitic acid, benzene-pentacarboxylic acid and the like. Any suitable polyhydric alcohol may be used such as, for example, ethylene glycol, 1,3-propylene glycol, 1,2-butylene glycol, 1,2-propylene glycol, 1,4-butylene glycol, 1,3-butylene glycol, 1,5-pentane diol, 1,4-pentane diol, 1,3-pentane diol, 1,6-hexane diol, 1,7-heptane diol, glycerine, trimethylolpropane, 1,3,6 - hexanetriol, triethanolamine, pentaerythritol, sorbitol and the like.

Any suitable polyhydric polyalkylene ether may be used such as, for example, the condensation product of an alkylene oxide beginning with any suitable initiator. The initiator may be a difunctional compound including water so that the resulting polyether is essentially a chain of repeating alkylene oxy groups as in polyethylene ether glycol, polypropylene polybutylene ether glycol and the like; or the initiator may be any suitable active hydrogen containing compound which may be a monomer or even a compound having a relatively high molecular weight including other active hydrogen containing compounds as disclosed herein. It is preferred that the initiator have from 2 to 8 active sites to which the alkylene oxides may add, including, for example, amines, alcohols and the like. Any suitable alkylene oxide may be used such as, for example, ethylene oxide, propylene oxide, butylene oxide, amylene oxide, tetrahydrofuran, epihalohydrins such as epichlorohydrin, styrene oxide and the like. Any suitable initiator may be used including, for example, water, polyhydric alcohols, preferably having 2 to 8 hydroxyl groups, amines, preferably having 2 to 8 replaceable hydrogen atoms bonded to nitrogen atoms. Phosphorous acids may also be used, but the phosphorous compounds are somewhat peculiar in that a different mode of preparation may be required, as more particularly set forth below. The resulting polyhydric polyalkylene ethers with the various bases of nitrogen, phosphorous and the like may have either primary or secondary hydroxyl groups or mixtures of primary and secondary hydroxyl groups. It is preferred to use alkylene oxides which contain from 2 to 5 carbon atoms and, generally speaking, it is advantageous to condense from about 5 to about 30 mols of alkylene oxide per functional groups of the initiator. There are many desirable processes for the preparation of polyhydric polyalkylene ethers including U.S. Patents 1,922,459, 3,009,939 and 3,061,625 or by the process disclosed by Wurtz in 1859 and in Encyclopedia of Chemical Technology, volume 7, pages 257 to 262, published by Interscience Publishers, Inc. (1951).

Specific examples of initiators are water, ethylene glycol, propylene glycol, glycerine, trimethylol propane, pentaerythritol, arbitol, sorbitol, maltose, sucrose, ammonia, diethanolamine, triethanolamine, dipropanolamine, tripropanolamine, diethanolpropanolamine, tributanolamine, 2,4 - tolylene diamine, 4,4' - diphenylmethane diamine, p,p',p''-triphenylmethane triamine, ethylene diamine, propylene diamine, propylene triamine, N,N,N',N'-tetrakis-(2-hydroxypropyl) ethylene diamine, diethylene triamine. The phosphorous containing polyols are more fully described below.

Any suitable polyhydric polythioether may be used such as, for example, the condensation product of thiodiglycol or the reaction product of a polyhydric alcohol such as is disclosed above for the preparation of the hydroxyl polyesters with any other suitable thioetherglycol. Other suitable polyhydric polythioethers are disclosed in U.S. Patents 2,862,972 and 2,900,368.

The hydroxyl polyester may also be a polyester amide such as is obtained, for example, by including some amine or amino alcohol in the reactants for the preparation of the polyesters. Thus, polyester amides may be obtained by condensing an amino alcohol such as ethanolamine with the polycarboxylic acids set forth above or they may be made using the same components that make up the hydroxyl polyester with only a portion of the components being a diamine such as ethylene diamine and the like.

Any suitable polyacetal may be used, such as, for example, the reaction product of formaldehyde or other suitable aldehyde with a polyhydric alcohol such as those disclosed above for use in the preparation of the hydroxyl polyesters.

Any suitable aliphatic polyol may be used such as, for example, alkane diols such as, for example, ethylene glycol, 1,3-propylene glycol, 1,2-propylene glycol, 1,4-butylene glycol, 1,3-butylene glycol, 1,5-pentane diol, 1,4-butane diol, 1,3-pentane diol, 1,6-hexane diol, 1,7-heptane diol, 2,2-dimethyl-1,3-propane diol, 1,8-octane diol and the like including 1,20-eicosane diol and the like; alkene diols such as, for example, 1-butene-1,4-diol, 1,3-butadiene-1,4-diol, 2-pentene-1,5-diol, 2-hexene-1,6-diol, 2-heptene-1,7diol, and the like; alkene diols such as, for example, 2-butyne-1,4-diol, 1,5-hexadiyne-1,6-diol and the like; alkane triols such as for example, 1,3,6-hexanetriol, 1,3,7-heptane triol, 1,4,8-octane triol, 1,6,12-dodecane triol and the like; alkene triol such as 1-hexene-1,3,6-triol and the like; alkyne triols such as 2-hexyne-1,3,6-triol and the like; alkane tetrols such as, for example, 1,2,5,6-hexane tetrol and the like; alkene tetrols such as, for example, 3-heptene-1,2,6,7-tetrol and the like; alkyne tetrols such as, for example, 4-octyne-1,2,7,8-tetrol and the like.

Any suitable aliphatic thiol including alkane thiols containing two or more —SH groups may be used such as, for example, 1,2-ethane dithiol, 1,2-propane dithiol, 1,3-propane dithiol, 1,6-hexane dithiol, 1,3,6-hexane trithiol and the like; alkene thiols such as, for example, 2-butene-1,4-dithiol and the like; alkyne thiols such as, for example, 3-hexyne-1,6-dithiol and the like.

Any suitable polyamine may be used including for example aromatic polyamines such as, for example, p-amino aniline, 1,5-diamino naphthalene, 2,4-diamino toluylene, 1,3,5-benzene triamine, 1,2,3-benzene triamine, 1,4,5,8-naphthalene tetramine and the like; aliphtic polyamines such as, for example, ethylene diamine, 1,3-propylene diamine, 1,4-butylene diamine, 1,3-butylene diamine, diethyl triamine, triethylene tetramine, 1,3,6-hexane triamine, 1,3,5,7-heptane tetramine and the like; heterocyclic polyamines such as, for example, 2,6-diamino pyridene, 2,4-diamino-2-aminomethyl pyrimidine, 2,5-diamino-1,3,4-thiodiazol and the like.

Phosphorus containing compounds are often advantageously used because of the flame retarding effect which they impart to the resulting plastics. These compounds often contain 1 or 2 phosphorous atoms as a nucleus and then have alkylene oxide side chains bonded to the phosphorous nucleus through either phosphate or phosphite type linkages. The phosphate compounds are advantageously prepared by condensing a mixture of phosphorous pentoxide and water with an alkylene oxide as more particularly set forth above. It is advantageous to use mixtures of phosphorous pentoxide and water which correspond to about 80 percent phosphorous pentoxide and about 20 percent water. But any amount within the range of about 65 percent to 90 percent phosphorous pentoxide and the balance water may be used and the whole range is contemplated. The phosphites are advantageously prepared in accordance with the method of U.S. Patent 3,009,929 where triphenyl phosphite, for example, is reacted with a polypropylene ether glycol to prepare a product having a molecular weight of about 500. Other processes are disclosed in the patent. It is also possible to use polyethers based or phosphorous which contain nitrogen atoms in addition to the phosphorous atoms. These compounds may be represented by the general formula:

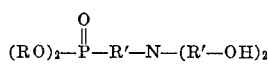

$$(RO)_2-\overset{O}{\underset{\|}{P}}-R'-N-(R'-OH)_2$$

wherein R is lower alkyl or phenyl, for example, methyl, ethyl, propyl, butyl and the like and the R' is alkylene, preferably having from 1 to 4 carbon atoms such as methylene, ethylene, 1,2-propylene, 1,4-butylene and the like. A preferred compound is dioxyethylene-N,N-bis-(2-hydroxyethyl)aminomethyl phosphonate.

Any of the compounds of any of the classes set forth above may be substituted with halogen such as, for example, chloro, bromo, iodo and the like; nitro; alkoxy, such as, for example, methoxy, ethoxy, carbomethoxy, carbethoxy and the like; dialkyl amino such as, for example, dimethyl amino, diethyl amino, dipropyl amino, methylethyl amino and the like; mercapto, carbonyl, thiocarbonyl, phosphoryl, phosphato and the like.

In the production of the polyurethane foams, in addition to the organic polyisocyanate, the active hydrogen containing compound and the blowing agent, which may be water, a halohydrocarbon such as dichlorodifluoromethane, trichlorofluoromethane or the like, an alkane such as hexane or the like, it is often advantageous to include other components which aid in making a product having the best physical properties. It is particularly desirable to use a catalyst and a stabilizer. Any suitable catalyst may be used, but as has been proposed heretofore, it is often desirable to have a mixture of a tin compound and a tertiary amine catalyst present. Any suitable tin compound may be used including, for example, stannous chloride or an organic tin compound. It is preferred to use the organic tin compounds such as the stannous salts of carboxylic acids including stannous oleate, stannous octoate, stannous stearate and the like. But one may also use tetravalent tin compounds including for example dibutyl tin dilaurate, dibutyl tin di-2-ethyl hexoate and the like. Any suitable tertiary amine catalyst may be used and a particularly strong tertiary amine catalyst is triethylene diamine. If weaker catalysts are desired one may use for example, N-methyl morpholine, N-ethyl-morpholine, diethyl ethanolamine, N-coco morpholine 1-methyl-4-dimethylamino ethyl piperazine, 3-methoxy-N-dimethyl propyl amine, N-dimethyl-N'-methyl isopropyl propylene diamine, N,N-diethyl-3-diethyl amino propyl amine, dimethyl benzyl amine, permethylated diethylene triamine and the like.

It is often advantageous in the production of cellular polyurethane plastics to include other additives in the reaction mixture such as, for example, emulsifiers, foam stabilizers, coloring agents, fillers and the like. It is particularly advantageous to employ an emulsifier such as, for example, sulphonated castor oil and/or a foam stabilizer such as a silicone oil such as, for example, a polydimethyl siloxane or an alkyl silane polyoxyalkylene block copolymer. The latter type of silicone oil is disclosed in U.S. Patent 2,834,748. Where polyhydric polyalkylene ethers are included in the reaction mixture to prepare a cellular polyurethane plastic, it is preferred to employ a silicone oil of the above patent within the scope of the formula:

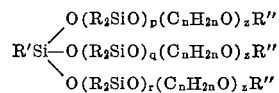

wherein R, R' and R" are alkyl radicals having 1 to 4 carbon atoms; p, q and r each have a value of from 4 to 8 and $(C_nH_{2n}O)_z$ is a mixed polyoxyethylene oxypropylene group containing from 15 to 19 oxyethylene units and from 11 to 15 oxypropylene units with z equal to from about 26 to about 34. A preferred compound has the formula:

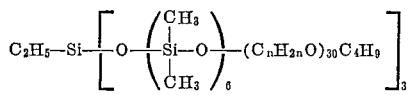

wherein $(C_nH_{2n}O)$ is a mixed polyoxyethylene and oxypropylene block copolymer containing about 17 oxyethylene units and about 13 oxypropylene units. Other suitable stabilizers are disclosed in Canadian Patents 668,478, 668,537 and 670,091. Other suitable compounds may therefore have the formula

$$(R')(SiO_3)_x(R_2SiO)_y[(C_nH_{2n}O)_zH]_a[R''']_{3x-a}$$

where x is an integer and represents the number of trifunctional silicone atoms bonded to a single monovalent or polyvalent hydrocarbon radical, R'; R is a monovalent hydrocarbon group as defined above; a is an integer having a value of at least 1 and represents the number of polyoxyalkylene chains in the block copolymer; y is an integer having a value of at least 3 and denotes the number of difunctional siloxane units, n is an integer from 2 to 4 denoting the number of carbon atoms in the oxyalkylene groups; and z is an integer having a value of at least 5 and denotes the length of the oxyalkylene chain. It will be understood further that such compositions of matter are mixtures of such block copolymers wherein y and z are of different values and that method of determining the chain length of the polysiloxane chains and the polyoxylene chains give values which represent average chain lengths. In the above formula, R represents monovalent hydrocarbon radicals, such as alkyl, aryl or aralkyl radicals, the polyoxyalkylene chain terminates with a hydrogen atom, R''' is an alkyl radical or a trihydrocarbonsilyl radical having the formula $R_3Si-$ where R is a monovalent hydrocarbon radical and terminates a siloxane chain, and R' represents a monovalent or polyvalent hydrocarbon radical, being monovalent when x is 1, divalent when x is 2, trivalent when x is 3, tetravalent when x is 4.

One type of block copolymer is represented when x in the above formula is one, and in this instance a branched chain formula may be postulated as follows:

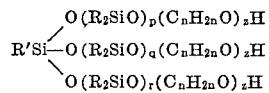

where $p+q+r=y$ of the above formula and has a minimum value of 3, the other subscripts being the same as in the foregoing formula. In this instance all three of the oxyalkylene chains are joined to the end of polysiloxane chains of the type $-(R_2SiO)-$. Specifically, one could use

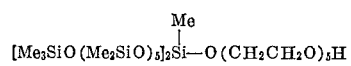

The polyisocyanates of the invention may also be used for the production of coating compositions. In this case, the organic compound containing active hydrogen containing groups is reacted with the polyisocyanates of the invention in an inert organic solvent therefor, such as, for example, methyl formamide, the diethyl ether of diethylene glycol, benzene, xylene, benzine and the like.

It is also possible to use the polyisocyanates of the invention in the preparation of elastomeric products which are non-porous for example by reacting an organic compound containing active hydrogen containing groups with an excess of the polyisocyanate of the invention in a first step to prepare an isocyanato-terminated prepolymer under anhydrous conditions. This prepolymer is then reacted in a second step with a chain extending agent such as, for example, 1,4-butane diol, 1,3-butane diol, the bis-beta-hydroxy ethyl ether of hydroquinone, water or the like by mixing the cross-linking agent with the prepolymer and casting the resulting mixture in a mold.

The polyurethane plastics of the invention are useful where polyurethanes have been used heretofore. For example, the foams are useful for cushions and especially rigid foams are useful for both sound and thermal insulation, for example, for walls of buildings. The coatings may be used to coat wood or metals such as steel and the like. The elastomers are useful, for the production of tires or for molded intems such as gear wheels or the like.

The invention is further illustrated by the following examples in which parts are by weight unless otherwise specified.

Example 1

About 44 parts of a mixture of about 80 percent 2,4- and about 20 percent 2,6-toluylene diamine and about 225 parts of ethanol are placed in a stainless steel stirred autoclave and about 10 parts of 5 percent rhodium on $Al_2O_3$ are added thereto. Hydrogen is then introduced under pressure and the temperature is controlled between about 50 and 150° C. for about 8 hours or until cessation of hydrogen absorption. The pressure is released and the contents of the autoclave discharged into a glass flask. After removal of the catalyst by filtration the alcohol is removed by evaporation. The crude alicyclic diamine mixture is used to make the corresponding diisocyanate as follows:

About 128 parts of the methyl diamino cyclohexanes obtained as described above are dissolved in about 1100 parts of o-dichlorobenzene and with stirring saturated with carbon dioxide at about 90–95° C. After saturation with carbon dioxide is complete as indicated by no further absorption, the resulting saturated solution is stirred approximately 6 hours at about 90° to 95° C. This mixture is cooled to a temperature below about 0° C., and about 360 parts of gaseous phosgene is introduced. During the phosgene addition the temperature is not allowed to rise above about 0° C. The solution is gradually heated to about 160° C., and phosgene is continuously introduced at this temperature until a clear solution results. At this time the excess phosgene is removed by blowing out with nitrogen gas for about 30 minutes. The crude isocyanate is isolated by fractional vacuum distillation.

Example 2

About 108 parts of a mixture of about 80 percent 2,4- and about 20 percent 2,6- toluylene diamine and about 300 parts of dioxane are placed in a stainless steel stirred autoclave and about 2.5 parts of ruthenium dioxide are added thereto. Hydrogen is then introduced under pressure and the temperature is maintained at about 100 to about 175° C. for about 8 hours. At this time approximately the theoretical amount of hydrogen has been absorbed.

The contents of the autoclave are then filtered to remove the catalyst. The dioxane is then distilled off at atmospheric pressure and the residue is distilled under a partial vacuum to give the colorless alicyclic diamine mixture.

The mixture is reacted with phosgene in accordance with the procedure of Example 1 to yield a mixture of 2,4- and 2,6-hexahydrotoluene diisocyanate.

Example 3

About 100 parts of a polyhydric polyalkylene ether prepared by condensing propylene oxide with glycerine until a polyalkylene ether triol having an hydroxyl number of about 56 is obtained, are mixed with about 39 parts of a mixture of 80 percent 2,4- and 20 percent 2,6-hexahydrotoluene diisocyanate and about 3 parts of water, about 0.3 part of stannous octoate, about 0.5 part of 1-methyl-4-dimethyl amino ethyl piperazine and about 1 part of a silicone oil having the formula

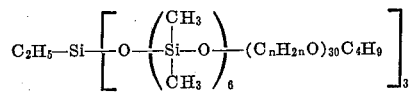

wherein $(C_nH_{2n}O)$ is a mixed polyoxyethylene and oxypropylene block copolymer containing about 17 oxyethylene units and about 13 oxypropylene units. These components are mixed in a machine mixer as disclosed in U.S. Reissue Patent 24,514 and discharged into a mold where they assume a creamy appearance and form a polyurethane foam in a short time. The resulting foam has a density of about 2 lbs./ft.$^3$.

Example 4

A coating composition is prepared by combining about 10 mols of a mixture of 80 percent 2,4- and 20 percent 2,6-hexahydrotoluene diisocyanate with about 2 mols trimethylol propane and about 3 mols of 1,4-butylene glycol. The resulting adduct is then reacted with a polyester prepared from adipic acid and diethylene glycol which has an hydroxyl number of about 56 in such a ratio that there are no free —NCO groups present but only a slight stoichiometric excess is used and in such proportions that a 50 percent solid solution in ethyl acetate is obtained. The resulting coating composition may be coated onto wood, metal and the like.

Example 5

About 100 parts of a polyether tetrol prepared by condensing about 4.5 mols propylene oxide onto pentaerythritol until an hydroxyl number of about 560 is reached, is mixed with about 90 parts of a mixture of 80 percent 2,4- and 20 percent 2,6-hexahydrotoluene diisocyanate, about 1 part of the silicone oil of Example 3, about 30 parts of trichlorofluoromethane, about 1.5 parts of 1-methyl-4-dimethyl amino ethyl piperazine and about 0.2 part of dibutyl tin dilaurate on a machine mixer as disclosed in U.S. Reissue Patent 24,514 and discharged into a mold where it reacts and expands to form a rigid polyurethane foam.

Example 6

About 100 parts of an hydroxyl polyester have a molecular weight of about 2000, an OH number of about 56 and an acid number of about 1.5, prepared from about 11 mols of ethylene glycol and about 10 mols of adipic acid are mixed with about 9 parts of 1,4-butane diol and about 28.6 parts of a mixture of about 80 percent 2,4- and 20 percent 2,6-hexahydrotoluene diisocyanate, the mixed components cast into a mold and permitted to solidify therein.

Example 7

About 100 parts of a polypropylene ether glycol having a molecular weight of about 2000 and an hydroxyl number of about 56 are mixed with about 27.8 parts of a mixture of 80 percent 2,4- and 20 percent 2,6-tolylene diisocyanate and about 12.6 parts of a mixture of 80 percent 2,4- and 20 percent 2,6-hexahydrotoluene diamine and cast into a mold. The casting time is improved over the use of aromatic amines as chain extenders.

Example 8

(a) In a one-liter stainless steel stirred autoclave is charged about 153.8 grams (about 1.26 mols) of toluene diamine, consisting of about 80 percent 2,4-isomer and 20 percent 2,6-isomer, about 5.0 grams of ruthenium oxide and about 600 ml. of dioxane (distilled from sodium). The autoclave is purged five times with hydrogen by building the pressure to above 200–250 p.s.i.g. and bleeding off. Reduction to the cyclohexane derivative was accomplished in about 40 hours at about 120–140° C. and at hydrogen pressure of about 3390 to 4400 p.s.i.g. An infrared spectrum of the crude product after removal of dioxane shows only a trace of aromatic material present. Fractional distillation in vacuo gave 126 g. of methylcyclohexyldiamine, boiling point 73.5–75° C. at 3.0 to 3.1 mm. A 2.1 gram sample of the diamine (soluble in water) requires about 32.6 ml. of 1 N HCl for neutralization. Calculated molecular weight is about 128.8 grams; theoretical for methylcyclohexyl diamine is about 128.3 grams. An infrared spectrum of the distilled material shows no contamination with aromatic. Yield of distilled diamine, basis toluene diamine charge, is about 78.2 percent.

(b) About 15 parts of reduced 80 percent 2,4- and 20 percent 2,6-toluene diamine prepared in Example 8(a) is dissolved in about 250 parts of dry orthene and this solution treated with $CO_2$ at about 25° C. There results a colloidal dispersion of the $CO_2$-salt of the diamines in orthene. This dispersion is then added, at 0–55 C., to a stirred solution containing about 100 parts of dry orthene which has been saturated with phosgene at about 0–5° C. A fine slurry results. This is then heated according to the following schedule with vigorous stirring and constant stream of phosgene being passed through the slurry: 1 hour at 75° C., 2 hours at 100° C., 6 hours at 125° C., 6½ hours at 142° C.

At this point the reaction mixture is a dark, clear solution which contains considerable —NCO as shown by infrared analysis. The solution is then flushed free of phosgene with nitrogen and fractionally distilled. The product is obtained at about 128–129° C. at 12 mm. pressure. About a 36 percent yield of 80 percent 2,4- and 20 percent 2,6-methyl cyclohexane diisocyanate is obtained.

(c) About 64 parts by weight of reduced 80 percent 2,4- and 20 percent 2,6-toluene diamine prepared as in Example 8(a) are dissolved in about 485 parts of dry orthene. This solution is treated with $CO_2$ at about 90° C. for about 6½ hours. A colloidal suspension of the $CO_2$ salt in orthene resulted. This suspension is then treated with phosgene and vigorous stirring for about 4 hours at about 0–5° C. The temperature is then increased and the slurry is treated with phosgene at about 100° C. for several hours, at about 110° C. for several hours and at about 160° C. for a total of about 28 hours. The reaction mixture is finally treated at about 174–177° C. for about 9 hours. During the course of the above heating program an insoluble solid forms in the reaction mixture and does not appear to react further with additional heating. (Further investigation indicates that this solid may be an N,N'-disubstituted urea arising from the condensation of about 1 mol of phosgene and about 2 mols of reduced toluene diamine. It forms if the temperature is raised too rapidly during the hot phosgenation step.) The above mixture of a dark, clear liquid plus the solid is then flushed free of phosgene and filtered. The filtrate is fractionally distilled under vacuum and the product obtained at about 126° C./12 mm. Analysis of this cut shows an —NCO content of about 42 percent (about 46 percent theoretical). Infrared analysis reveals no aromatic material, no free amine and much —NCO. About a 16.5 percent yield of 80 percent 2,4- and 20 percent 2,6-methyl cyclohexane diisocyanate is obtained.

(d) About 30 parts of reduced 80 percent 2,4- and 20 percent 2,6-toluene diamine prepared as in Example 8(a) are dissolved in about 200 parts of dry orthene and this solution is added to a solution consisting of about 400 parts of dry orthene saturated with phosgene at about 0–5° C. The combining of these solutions is carried out at 0–5° C. with vigorous stirring and a continuous stream of phosgene passing through the reaction mixture. The resulting slurry is then treated as follows: with stirring and continuous phosgene, heated at 0–5° C. for about 15 minutes, at 75° C. for 5½ hours, at 100° C. for 4 hours, at 120° C. for 4 hours and 140° C. for 3 hours. At this point the reaction medium is a brown, clear solution. This solution is fractionally distilled and the product obtained at 125–127° C./12 mm., 21.2 percent yield of 80 percent 2,4- and 20 percent 2,6-methyl cyclohexane diisocyanate is obtained. Infrared analysis shows no aromaticity, no free amine and much —NCO.

It is to be understood that the foregoing working examples are given for the purpose of illustration and that any other suitable hydrogenation catalyst, amine, active hydrogen containing compound, urethane catalyst or the like could be used provided that the teachings of this disclosure are followed.

The cyclohexane polyamines and cyclohexane polyisocyanates of the invention are useful to prepare polyurethane plastics as disclosed above.

Although the invention has been described in considerable detail in the foregoing, it is to be understood that such detail is solely for the purpose of illustration and that many variations can be made by those skilled in the art without departing from the spirit and scope of the invention except as set forth in the claims.

What is claimed is:
1. A polyurethane plastic prepared by reacting a mixture of at least 50% 2,4- and at least 5% 2,6-hexahydrotoluene diisocyanate with an organic compound containing at least 2 active hydrogen containing groups as determined by the Zerewitinoff method.

2. A cellular polyurethane plastic prepared by reacting, in the presence of a blowing agent, a mixture of at least 50 percent 2,4- and at least 5 percent 2,6-hexahydrotoluene diisocyanate with an organic compound containing at least 2 active hydrogen containing groups as determined by the Zerewitinoff method.

3. A cellular polyurethane plastic prepared by a process which comprises reacting, in the presence of a blowing agent, a mixture of about 80 percent 2,4-hexahydrotoluene diisocyanate and about 20 percent 2,6-hexahydrotoluene diisocyanate with a polyhydric polyalkylene ether in the presence of an organic tin catalyst and a tertiary amine catalyst and an alkyl silane oxyalkylene block copolymer.

4. A coating composition prepared by a process which comprises combining in an inert organic solvent a mixture of at least about 50 percent 2,4- and at least about 5 percent 2,6-hexahydrotoluene diisocyanate with an organic compound containing active hydrogen containing groups as determined by the Zerewitinoff method.

References Cited

UNITED STATES PATENTS

| | | |
|---|---|---|
| 2,986,576 | 5/1961 | Bonetti et al. _____ 260—453 |
| 3,075,928 | 1/1963 | Lanham _____ 260—25 |
| 3,248,370 | 4/1966 | Reischl et al. _____ 260—75 |

DONALD E. CZAJA, *Primary Examiner.*

M. J. WELSH, *Assistant Examiner.*

U.S. Cl. X.R.

260—32.6, 33.2, 33.6, 75, 77.5, 453, 563